United States Patent [19]

Rice et al.

[11] 4,310,747

[45] * Jan. 12, 1982

[54] METHOD AND APPARATUS UTILIZING A POROUS VITREOUS CARBON BODY PARTICULARLY FOR FLUID HEATING

[75] Inventors: Warren A. Rice, Dexter; Clarence S. Vinton, Ann Arbor; Charles H. Franklin, Ann Arbor; Christopher J. Torbett, Ann Arbor, all of Mich.

[73] Assignee: The Fluorocarbon Company, Anaheim, Calif.

[ * ] Notice: The portion of the term of this patent subsequent to Sep. 2, 1997, has been disclaimed.

[21] Appl. No.: 128,193

[22] Filed: Mar. 7, 1980

Related U.S. Application Data

[62] Division of Ser. No. 928,051, Jul. 26, 1978, Pat. No. 4,220,486.

[51] Int. Cl.[3] .......................... H05B 3/14; C01B 31/00

[52] U.S. Cl. ............................ 219/381; 219/10.55 A; 219/10.55 E; 252/510; 338/225; 126/415

[58] Field of Search ................................ 219/368-382, 219/553, 10.55 F, 10.55 M, 10.53, 10.57, 10.49; 264/29; 423/444, 449, 445, 447.7, 447.9, 447.8; 29/610, 611; 252/500, 502, 504, 510, 511, 517; 338/224, 225; 126/415, 449; 165/485

[56] References Cited

U.S. PATENT DOCUMENTS

| | | | |
|---|---|---|---|
| 2,481,760 | 9/1949 | Leher | 423/445 |
| 2,956,614 | 5/1960 | Hervert | 219/381 |
| 3,835,435 | 9/1974 | Seel | 219/381 |
| 3,843,950 | 10/1974 | Schladitz | 338/208 |
| 3,860,789 | 1/1975 | Maake | 219/532 |
| 3,922,334 | 11/1975 | Marek et al. | 423/449 |
| 3,927,186 | 12/1975 | Vinton et al. | 423/447 |
| 4,003,388 | 1/1977 | Nopanen | 132/9 |
| 4,019,021 | 4/1977 | Schladitz | 219/381 |
| 4,067,956 | 1/1978 | Franklin et al. | 423/445 |
| 4,075,459 | 2/1978 | Lieber | 219/375 |
| 4,122,329 | 10/1978 | Godel | 219/375 |
| 4,220,846 | 9/1980 | Rice et al. | 219/381 |

FOREIGN PATENT DOCUMENTS

| | | | |
|---|---|---|---|
| 2410999 | 12/1974 | Fed. Rep. of Germany | 219/381 |
| WO8000334 | 6/1980 | PCT Int'l Appl. | 338/283 |

OTHER PUBLICATIONS

Brochure-Reticulated Virtreous Carbon-1976, Chemtronics International Inc.

Textiles, vol. 77, No. 39, Pub 1972, Ishikawa et al., Carbon Fibres, see p. 69, col. 2, Abstract #166029f, Japan.

*Primary Examiner*—Arthur T. Grimley
*Assistant Examiner*—Bernard Roskoski
*Attorney, Agent, or Firm*—Knobbe, Martens

[57] ABSTRACT

A body of a specially prepared, porous vitreous carbon which does not crack or substantially change in electrical resistance with time when heated to elevated temperatures in air and which is used in a method or apparatus to heat a fluid stream flowing in the pores of the body as a result of natural convection or pumping of the fluid is described. The body is composed of electrically conductive rigid, interconnected and multidirectional continuous strands of vitreous carbon forming a rigid porous, three dimensional skeletal structure. The body as an electrical resistance element has current conductive paths between at least two regions; is shaped to provide particular cross-sections along the conductive paths; and has electrical connector means attached at the regions of the body so that current can be distributed through the body. The electrical resistance element is particularly useful as a heating element for air flowing through the pores in electrically powered room space heaters, hair dryers, hand dryers and the like and can also function as a self-cooling resistor. In a like manner, electromagnetic energy is used to heat a body of the porous vitreous carbon so as to heat a fluid stream flowing through the pores.

7 Claims, 14 Drawing Figures

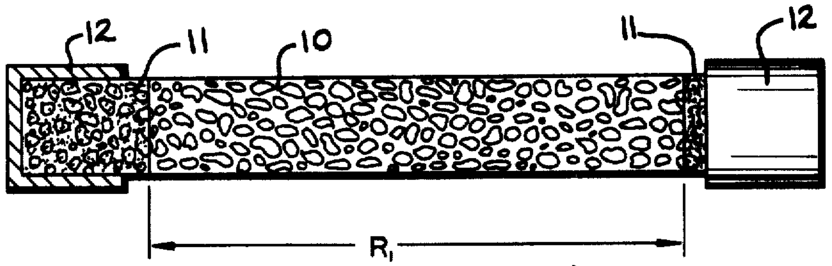
FIG. 1
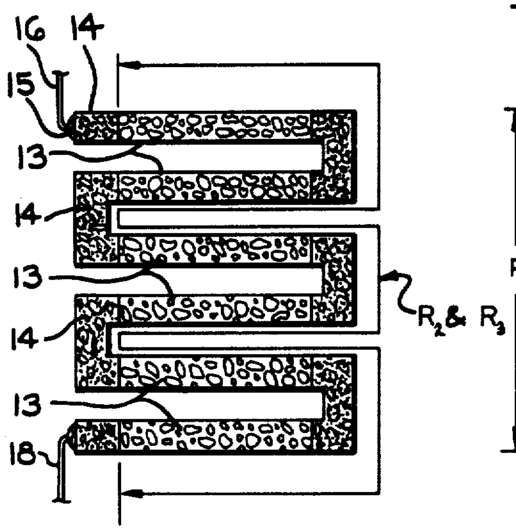
FIG. 2
FIG. 3
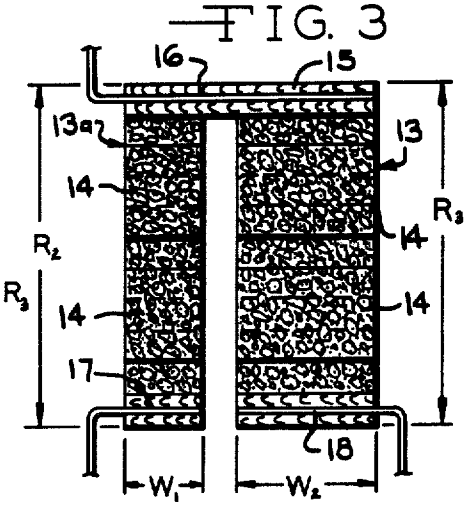
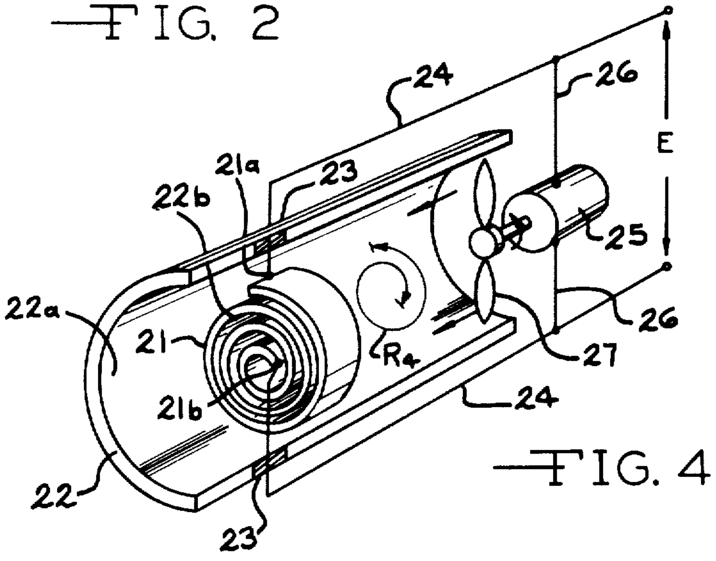
FIG. 4

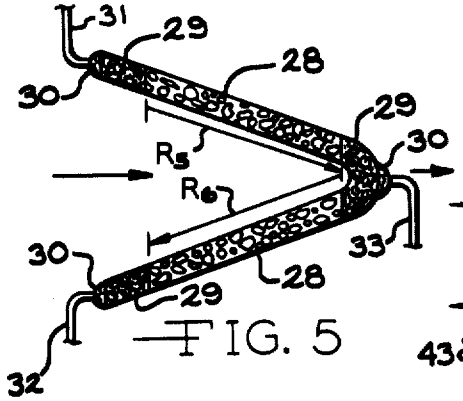
FIG. 5
FIG. 6
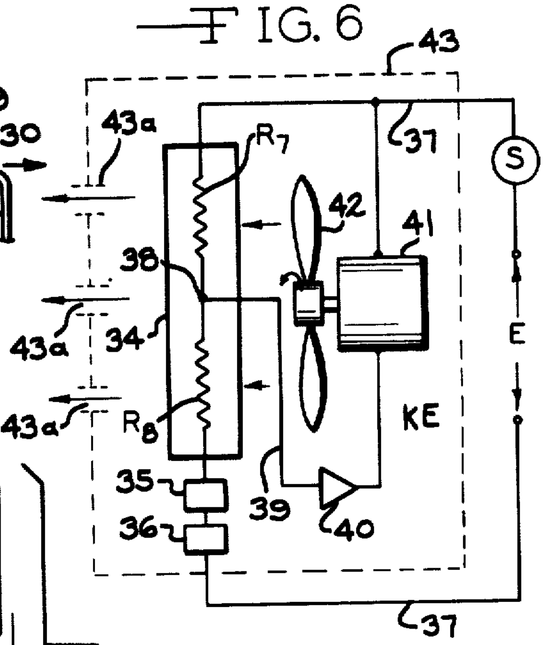
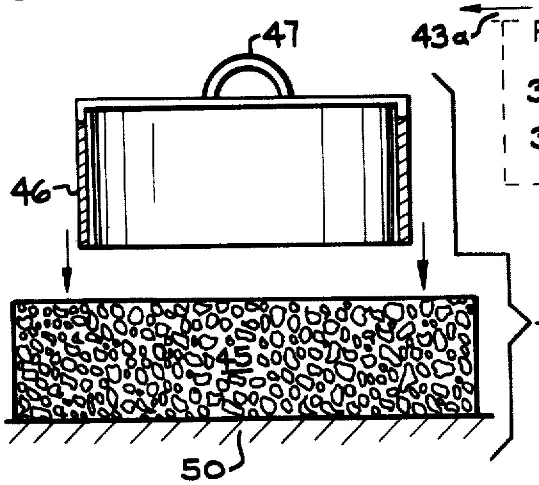
FIG. 7
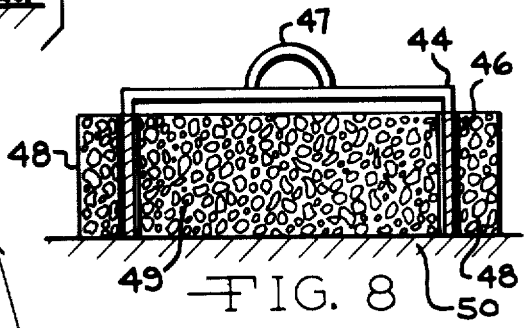
FIG. 8
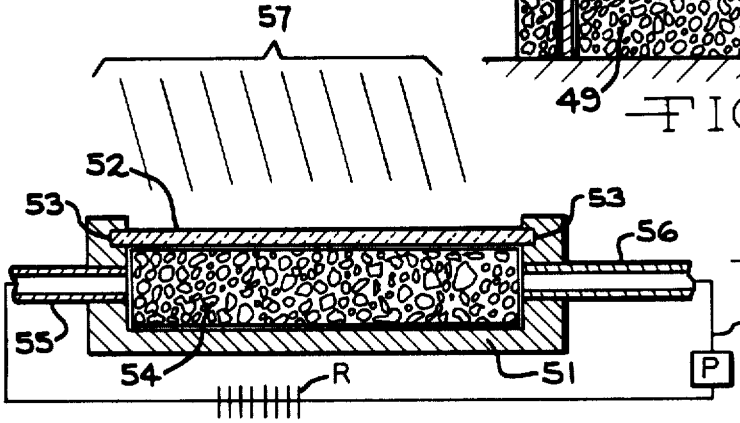
FIG. 9

METHOD AND APPARATUS UTILIZING A POROUS VITREOUS CARBON BODY PARTICULARLY FOR FLUID HEATING

This is a division of application, now U.S. Pat. No. 4,220,486 issued Sept. 2, 1980. Ser. No. 928,051, filed July 26, 1978.

BACKGROUND OF THE INVENTION

1. Field of the Invention

The present invention relates to electrical resistance elements and fluid heating apparatus utilizing a rigid, porous vitreous carbon body. In particular, the present invention relates to apparatus fitted with the porous vitreous carbon body which when heated by electrical or electromagnetic energy functions as a heater for fluids, particularly air, flowing through the pores in the body.

2. Prior Art

The use of vitreous carbon fibers woven into thin cross-section flexible mats as electrical resistance elements, particularly as relatively low temperature fluid heaters, is known. The mats are sometimes sealed in a flexible protective envelope. Such mats are not rigidly self-supporting and therefore require mechanical means to stay in place in a moving fluid stream and also have a relatively high resistance to fluid flow as measured by pressure-drop across the element. It would be valuable to have carbon resistance elements which are self-supporting, do not change in shape under flow conditions and have low pressure-drop characteristics. It would also be valuable to provide an efficient self-cooling resistor.

Nickel-chromium wire resistance heating elements are used almost universally in air stream heaters. Usually the elements are in the form of helical coils of the wire which are mounted on an insulator around which the air stream flows. There are two types of heaters, a low temperature heater which typically operates at an average wire temperature of about 380° C. (716° F.) and a high temperature heater which typically operates at an average wire temperature of 855° C. (1571° F.) as measured with an infrared thermometer. The heated wire in turn typically heats the air stream to about 135° C. (275° F.) for the low temperature heater or to 350° C. (662° F.) for the high temperature heater. The large wire temperature to heated air temperature differentials result because of the low effective heat transfer area of the resistance wire. At best, the response time of the heater at start-up is several seconds before the air is heated to the required temperature because of the thermal inertia of the wire. The high temperature of the wire at least with the high temperature heater means that the housing for the element must be designed to withstand melting from the heat radiated by the wire at these operating temperatures and the wire must be supported to prevent sagging from thermal softening with consequent touching of the housing at the elevated temperature, in addition to being supported in such fashion as to accommodate the large dimensional changes in the wire resulting from thermal expansion or element breakage. It would be very useful to provide a resistance element which had a very short response time at start-up and could be operated at low temperatures because of better heat transfer and yet was strong enough to resist distortion or damage by the flow of the air stream through the heated element and which was self-supporting and not subject to large dimensional changes with changes in temperature or to thermal softening with consequent undesired electrical contacts on element breakage.

Many carbon shapes when electrically heated in an air stream to a temperature which is nominally about 350° C. (662° F.) begin to oxidize significantly and then burn in the air, because the heat transfer of the shape to the air stream is irregular and locally portions of the carbon shape reach much higher temperatures causing combustion, which may be flameless but can be relatively rapid. Also, it is possible that minute breaks in the carbon shape form current breaks which cause localized overheating. For this reason carbon is not usually used in air heater applications where the operating temperatures are nominally about 350° C. (662° F.), where "nominally" means that there can be brief fluctuations to higher temperatures of up to about 600° C. (1112° F.). It would be a significant improvement if a carbon resistance heating element could be shaped so as to provide rapid heat transfer to the air to prevent localized overheating and current breaks and to allow operation of the element at surface temperatures very close to the desired output air temperature which is usually between 37.8° C. to 204.4° C. (100° F. to 400° F.) in most applications and can be as high as about 350° C. (662° F.) in some applications.

Also, there is a need for an economical apparatus and method where radiant electromagnetic energy, such as solar energy or microwaves can heat a fluid stream. A radiant energy absorptive element of the type described herein would be used for heat transfer.

SUMMARY OF THE INVENTION

Objects

It is therefore an object of the present invention to provide electrical resistance elements and heating apparatus including a porous, rigid vitreous carbon body which rapidly heats a fluid flowing through the element and which is resistant to change in shape as a result of the fluid flow and temperature rise. It is further an object of the present invention to provide an element and heating apparatus which transfers heat very efficiently with a very low temperature differential between the rigid porous vitreous carbon body and the fluid stream being heated and which upon start-up provides a heated fluid stream almost instantly at the selected temperature of the element or apparatus. Further still, it is an object of the present invention to provide a preferred rigid porous vitreous carbon body in an element or apparatus which can operate at 350° C. (662° F.) in an air stream without significant cracking or change in electrical resistance with time. Further still, it is an object of the present invention to provide a self-cooling electrical resistance element. It is further an object of the present invention to provide an electromagnetic energy powered fluid heater and a method for heating fluids. These and other objects will become increasingly apparent by reference to the following description and the drawings.

General Description

The present invention relates to the method which supplies heat to a fluid which comprises: providing a body of rigid interconnected, multi-directional and continuous strands of vitreous carbon forming a rigid porous three dimensional skeletal structure; and supplying electrical or electromagnetic energy to the body such that a fluid flowing in the body is heated by heat transfer, wherein the body is at a temperature such that the body has an electrical resistance measured at room temperatures which remains substantially constant with time in the presence of the heated fluid. The resistance measurements are made at the room temperatures which are usually between 15.6° to 32.2° C. or 60° to 90° F.

The invention also relates to the apparatus for supplying heat to a fluid stream which comprises: a body of rigid interconnected, multi-directional and continuous strands of vitreous carbon forming a rigid porous three dimensional skeletal structure; means for supplying electrical or electromagnetic energy to the body, such that the body is heated by the energy; and means for supplying a fluid stream through the body such that the fluid stream is heated by heat transfer with the heated body and such that the body has an electrical resistance measured at room temperatures which remains substantially constant in the presence of the heated fluid stream.

The present invention particularly relates to an electrical resistance element which comprises a body of rigid interconnected and multidirectional continuous strands of vitreous carbon forming a rigid porous three dimensional skeletal structure with current conductive paths between at least two regions of the body and at least two electrical connector means attached to the regions so that an electrical current can be distributed through the body. Preferably the regions are plated with a metal and then a conductor is attached to the metal to provide distribution of the current to the body. The resistance element is especially useful as a heater for a fluid stream, particularly air which is pumped or blown through the porous body. Preferably the body of the element has a shape and a porosity and has been heat treated such that the body can be electrically heated nominally to at least about 350° C. (662° F.) and air flowed through without substantial change in electrical resistance (measured at room temperatures of about 15.6° to 32.2° C. or 60° F. to 90° F.) or cracking upon operation over relatively long periods of time.

The present invention also relates to the method for the preparation of an electrical resistance element which comprises shaping a rigid body of interconnected and multidirectional continuous strands of vitreous carbon forming a rigid porous three dimensional skeletal structure to provide current conductive paths between at least two regions of the body; and mounting at least two electrical connector means to the body at the regions so that an electrical current can be supplied through the body. Usually the electrical conductor means is provided by coating a metal on the regions of the body and then attaching a metal conductor to the metal coating.

The body of the porous, vitreous carbon skeletal structure is a material generally known to the prior art. Electrical continuity of the strands forming the body is important to the present invention to prevent current breaks and thus the crack-free strands in the structures described in U.S. Pat. No. 3,927,186 to Vinton and Franklin, which remain crack-free under thermal stress, are much preferred as starting materials for the present invention. This patent describes a rapid method for forming vitreous (glassy) carbon structures from a flexible polyurethane resin reticulate structure, which faithfully reproduces the geometry of the uncarbonized polyurethane resin reticulate structure. The first step of the method comprises infusing the polyurethane resin reticulate structure with a curable furan resin or resin precursor, particularly furfuryl alcohol. The furan resin as a curable liquid resin or resin precursor swells the polyurethane reticulate structure during infusion and forms a gel-like alloy structure with the polyurethane resin as the solid phase. An important step in the method, which assists in preventing cracking of the strands during carbonization and which is essential to faithful strand geometry reproduction, is the substantial removal of the liquid resin or resin precursor coating from the polyurethane reticulate structure surfaces after the infusion or swelling step. The method allows rapid heating with less than about five hours for carbonization of the infused structures without cracking; however, longer carbonization periods can be used. The resulting carbon reticulate structures remain crack-free and strong even when exposed to very rapid temperature variations.

In U.S. patent application Ser. No. 782,624, filed Mar. 30, 1977 and assigned to a common assignee, another preferred method for preparing vitreous carbon structures is described. Thermoset or thermosettable resin containing foams, prepared by a method wherein thin membranes dividing contiguous cells in a thin membraned, thick stranded thermoset or thermosettable resin foam with interconnected cells are produced, and are thermally reticulated. The foams are preferably thermally reticulated by providing a combustible gas mixture inside the cells of the foam and then igniting the mixture to destroy the foam membranes. The thermosettable or thermoset reticulate resin structures so produced are then used to prepared vitreous carbon structures with the same geometry by heating at elevated temperatures under reducing, inert or vacuum conditions.

There are other methods known to those skilled in the art for producing the porous vitreous carbon starting material, such as the method described in U.S. Pat. No. 3,922,334 to Marek and U.S. Pat. No. 4,067,956 to Vinton and Franklin. The method for the preparation of such porous vitreous carbon structures does not constitute part of the present invention.

The vitreous carbon used in the present invention has preferably been heat treated or baked in a reducing, neutral or vacuum environment so that it will not crack or substantially change its electrical resistance with time (measured at room temperatures) when heated in air with an electrical current to about 350° C. (662° F.) for a sustained period of time of, usually, at least several weeks. A reducing environment can be hydrogen and a neutral environment can be nitrogen or argon, for instance. The vitreous carbon must be heated to a temperature of at least about 1800° C. (3272° F.) in nitrogen so the product is stable in respect to these properties. The heat treating can be at a much higher temperature up to the volatilization point of the vitreous carbon, which is about 3500° C. (6332° F.) or higher. Vitreous carbon will form at lower temperatures of about 700° C. but the body is not completely converted to the carbon. Without this heat treatment, the vitreous carbon is not stable and will crack and/or change electrical resistance measured at room temperatures significantly with time when electrically heated at about 350° C. (662° F.). Unexpectedly it was found with heat treatment at lower temperatures less than about 1600° C. (2912° F.) in nitrogen and electrical resistance heating, in air, that localized areas of the strands were reaching much higher temperatures than programmed which resulted in cracking. This result was obtained with heating at an element surface temperature of 350° C. (662° F.) even with porous vitreous carbons which had been heat treated to 1400° C. (2552° F.). A significant or substantial change is more than a five (5%) percent change in electrical resistance. With heat treatment in nitrogen to 1000° C. (1832° F.) and an element structure temperature in air of 125° C. (257° F.), a room temperature electrical resistance change greater than five percent (5%) occurred in about 1000 hours. With these carbons there is very significant change in electrical resistance as a function of time at heater element surface temperatures above about 125° C. (257° F.). Thus this heat treatment at well above about 1000° C. (1832° F.) of the porous vitreous carbon body is very important since stability of the electrical resistance in relation to heating of the body for prolonged times at elevated temperatures in the presence of air is required for most commercial applications.

An important step in the construction of the electrical resistance element of the present invention is that the electrical connection means must distribute the current in the element. Usually this means that these connection regions on the porous vitreous carbon are coated with a metal such as by vapor deposition, flame or plasma spraying or preferably by electrodeposition. In this manner the connection regions are coated with the metal so that current is distributed to each of the individual vitreous carbon strands from the connection regions. Generally if the carbon strands are embedded in an electrically conductive material which intimately and conductively contacts the surfaces of the strands there will be suitable electrical connection; however, a metal coating is preferred for elevated temperature heater applications to facilitate soldered or welded connections.

DESCRIPTION OF DRAWINGS

FIG. 1 is a front view of an electrical resistance element according to the present invention in partial section illustrating a straight, unfolded electrical resistance element having a cylindrical cross-sectioned, porous vitreous carbon body which provides a suitable resistance.

FIG. 2 is a side view of a preferred electrical resistance element of the present invention illustrating a double bodied, folded porous vitreous carbon resistance element construction to provide two separate current conductive paths through the two bodies and thus two electrical resistances.

FIG. 3 is an end view of the electrical resistance element of FIG. 2 particularly illustrating the positioning of the two porous vitreous carbon bodies.

FIG. 4 is a perspective, schematic, partial cross-section view of a spiral electrical resistance element in a blower particularly illustrating the movement of a gas stream provided by the blower in a conduit with a spiral porous vitreous carbon resistance element.

FIG. 5 is a side view of a flat sided, V or U shaped, porous vitreous carbon body as a folded electrical resistance element particularly illustrating a voltage dividing connector means at the point of the V and a gas stream flow direction into the V.

FIG. 6 is a schematic electrical diagram particularly illustrating a circuit for the use of the porous vitreous carbon resistance element as a voltage divider for providing a lower voltage to a blower in a hair drying device or the like.

FIGS. 7 and 8 are cross-sectional views which particularly illustrate the "cookie cutter" or die cutting step for shaping the body of the porous, vitreous carbon prior to attaching the connector means in the method for forming the resistance element of the present invention.

FIG. 9 is a cross-sectional view of an apparatus for the radiant electro-magnetic energy heating of the porous carbon body.

DETAILED DESCRIPTION

Figure 10:
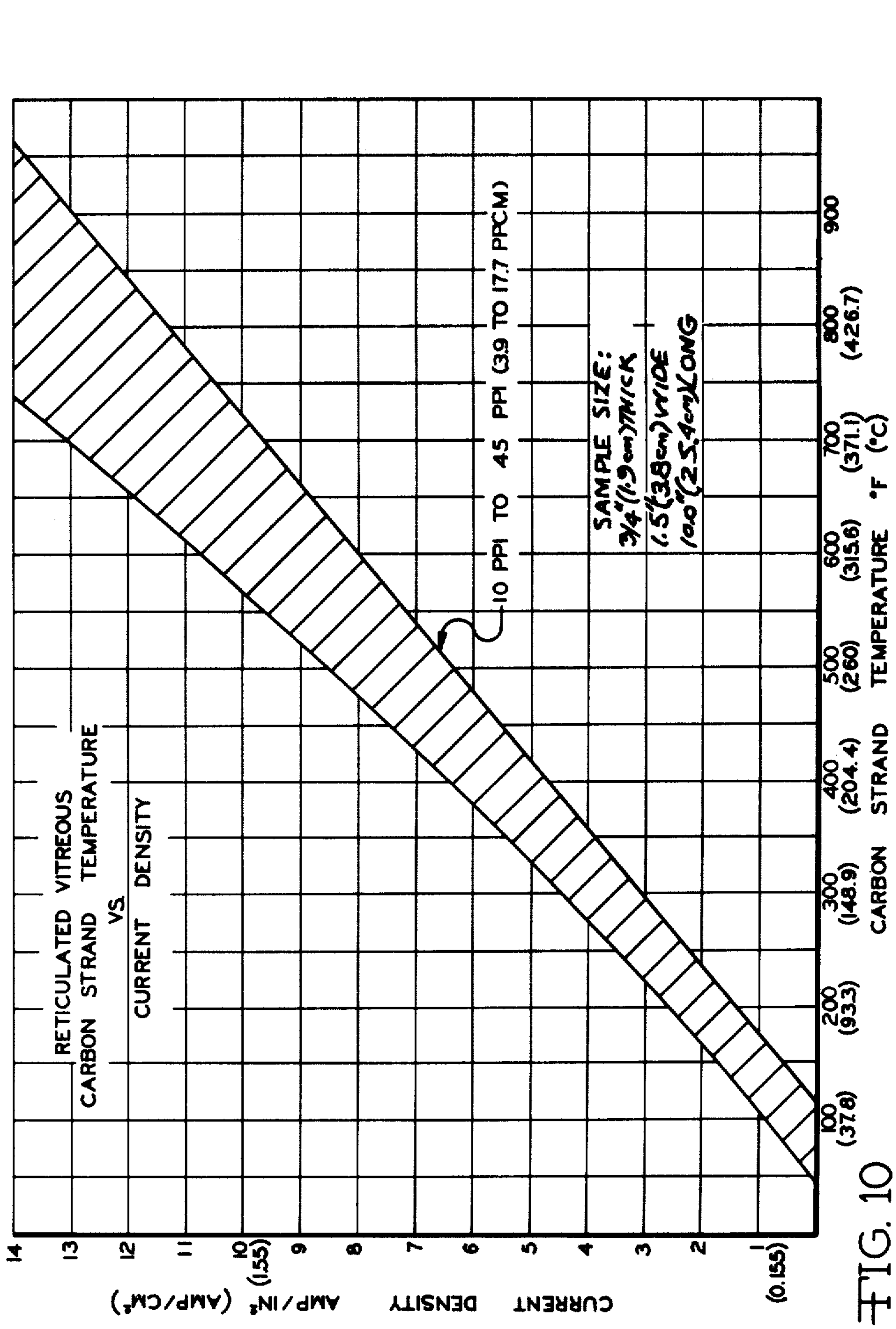
FIG. 10 is a graph of data defining curves showing the induced carbon strand temperature versus current density in still air for an unfolded, porous vitreous carbon bodied resistance element of the dimensions specified on the graph and for various porosities for vitreous carbon heat treated at 1000° C. (1832° F.).

Preferably the body is macroporous with between about 4 to 47 ppcm or pores per cm (about 10 and 120 ppi or pores per inch) and has a density of about 0.05 g/cc (3.1 pounds per cubic foot). The bulk resistivity of the porous, vitreous carbon prepared by the method of U.S. Pat. No. 3,927,186 and heat treated at 1000° C. in nitrogen is between about 0.22 and 0.44 ohm-inches and characteristically the electrical resistance decreases with increase in temperature. The electrically induced temperature of the 1000° C. (1832° F.) heat treated carbon strands up to about 426.7° C. (800° F.) in still air versus the current density is shown in FIG. 10.

FIGS. 1 to 5 show various folded and unfolded shapes of reticulated vitreous carbon bodied electrical resistance elements prepared according to the method of the present invention. FIG. 1 shows a straight, cylindrical body of the porous carbon 10 with the opposing ends plated with a metal coating 11, particularly copper. Caps 12 are soldered to the metal coating 11 to provide a good electrical connection. The current is thus distributed through the body 10. Preferably the devices are adapted for use at 120 or 240 VAC.

FIGS. 2 and 3 show a folded resistance element with porous vitreous carbon bodies 13 and **13*a* and conductive plated coatings 14 on two opposite sides of the bodies 13 and 13*a*. The coatings 14 are on the folded corners or bends formed on the sides of the body 13 and solder 15 attaches wires 16, 17 and 18 of the bodies 13 and 13*a*. The wire 16 supports the two resistance legs $R_2$ and $R_3$ formed by the bodies 13 and 13*a* which have a decreased resistance as a function of increased width $W_1$ and $W_2$ of the bodies 13 and 13*a* since the height of the cross-section is the same. The wire 16** acts as a connection between resistances $R_2$ and $R_3$.

FIG. 4 shows a spiral porous vitreous carbon bodied resistance element 21 in a conduit 22 defining a passage 22a provided with insulators 23 supporting line voltage wires 24 attached to ends 21a and 21b of the element 21. The element 21 forms the resistance path $R_4$. A blower motor 25 is connected by leads 26 to the line voltage wires 24. The blower 25 is provided with a fan 27 which forces air through the passage 22a in conduit 22 and the openings 22b in the element 21. When the line voltage E is applied to wires 24, the fan 27 rotates and forces air through the electrically heated resistance element 21 to heat the air. This device has been found to be a particularly satisfactory, very rapidly responsive hand dryer.

FIG. 5 shows a V shaped resistance element with a porous vitreous carbon body 28 and metal coated surfaces 29. Solder 30 holds wires 32, 32 and 33 in place on the coated regions 29. The wire 33 at the point of the V forms a voltage divider so that the body 28 forms resistances $R_5$ and $R_6$. An air stream to be heated can be flowed into the V of the body 28 as shown by the arrows in FIG. 5.

FIG. 6 shows an electrical circuit for a hair dryer type device. This circuit has a porous vitreous carbon resistance element 34 in electrical series with a thermal relay 35, such as a bi-metallic relay, and with a thermally meltable fuse 36 and is connected to the line voltage E by wires 37. The resistance 34 is divided into legs $R_7$ and $R_8$ and can be, for instance, the element shown in FIGS. 2, 3 or 5. The resistance $R_7$ reduces the voltage E to kE at point 38 where wire 39 is connected through diode 40 to a D.C. motor 41 provided with a fan 42. The motor 41 usually operates at 20 volts or less D.C. A suitable hand held housing 43 with openings 43a (shown in broken lines) is provided for the element 34 and the blower 41 so that the fan 42 forces air through the pores in the element 34 upon the application of the line voltage E. The dryer is instantly responsive in supplying heated air upon the application of the voltage E by turning on switch S.

FIGS. 7 and 8 illustrate the use of a die element or "cookie cutter" as the preferred method for forming the resistance element body 49. The die 44 includes a channel 46 and a holder 47. By simply forcing the die 44 into a larger porous vitreous carbon sheet 45 on a flat surface 50, or forcing the body 49 into the die 44, shaping is achieved to form the body 49 with waste or trim 48. This is the preferred method for forming the body 49 and many shapes, as shown in FIGS. 1 to 5, can be achieved by this method.

Other conventional metal, ceramic and wood forming tools can be used to shape the carbon 45. The body 49 can be formed by conventional wood and metal tools such as saws, band saws, lathes, drills, sanders, and the like and may also be shaped by forcing it past a fixed tensioned wire. Holes, tubes, discs and rings can be produced by using a cork borer. Two dimensional shaping is provided by the die technique by shaping the die to the desired cross-sectional configuration. Three dimensional bodies 49 can be formed by forcing objects of nearly 0° draft into a block of the porous vitreous carbon 45.

In all of the above described machining and die forming operations, material removal from the porous vitreous carbon is accomplished by breaking the strands that make up the carbon. As a consequence, the overall tolerances to which the resulting body can be held will be affected by the pore size of the starting structure. Thus closer tolerances can be obtained with finer pore sizes such as 24 ppcm to 40 ppcm (about 60 to 100 ppi). Because the strands are hard (6 to 7 MOHS), production type processing requires the use of tungsten carbide tipped tools as ordinary carbon steel tools soon lose their edge. Higher density grades of the carbon, such as described in U.S. Pat. No. 4,067,956, which are difficult to form by the die cutting means, can be cut by diamond saws or lasers.

The regions of the shaped body for the electrical connection means are then preferably electroplated or coated with a metal using conventional methods. It has been found that electroplating copper on the porous carbon is a particularly satisfactory method. Porous vitreous carbon is not wetted by molten solder and thus the solder connection cannot be provided by immersion. Metal wires can then be soldered or welded on the metal coating.

Alternatively, a graphite cement, such as Graphoxy TM Cement grade G.C. made by Dylon Industries of Ohio or Union Carbide's C-34 TM, can be used to form the electrical connection. These cements are composed of thermosetting resins which bond conductive particles, particularly graphite particles. The C-34 cement can also be carbonized at 1000° C. (1832° F.) to produce conductively bonded graphite particles.

Bonds on the porous vitreous carbon body which do not have to be electrically conductive or endure very high temperatures can be made with many common adhesive materials such as epoxy, silicone rubber sealant, phenolics or resorcinol-aldehyde resins or those commonly used for bonding wood, like the hot melt glues, to name a few. Hot melt glues can be used to bond aluminum plates to the porous vitreous carbon body. Threaded fasteners such as metal bolts may be attached by infusion potting and curing local areas of the body with epoxy and then drilling and tapping. The epoxy resin can be made electrically conductive by adding graphite powder to the mix, such as in Dylon's Graphoxy TM. High temperature bonds that need not be electrically conductive can be made with Insa-Lite-Hi-Temp No. TM paste made by Sauereisen Cement Company of Pittsburg, Pa.

The use of electromagnetic energy, such as solar or microwave energy, to heat the porous vitreous carbon is shown in FIG. 9. Thus a sealed container 51 is provided with a transparent window 52 which is sealed in the container by recess 53 into which the porous vitreous carbon 54 is placed. The container 51 is provided with conduits 55 and 56 for introducing and removing a fluid, such as air or water. A pump P is provided for circulating the fluid which is shown as a closed system. The electromagnetic energy 57 is beamed through the window 52 to heat the vitreous carbon which in turn heats the fluid. A radiator R is shown in conduit 58 for effecting heat transfer to air.

Figure 11:
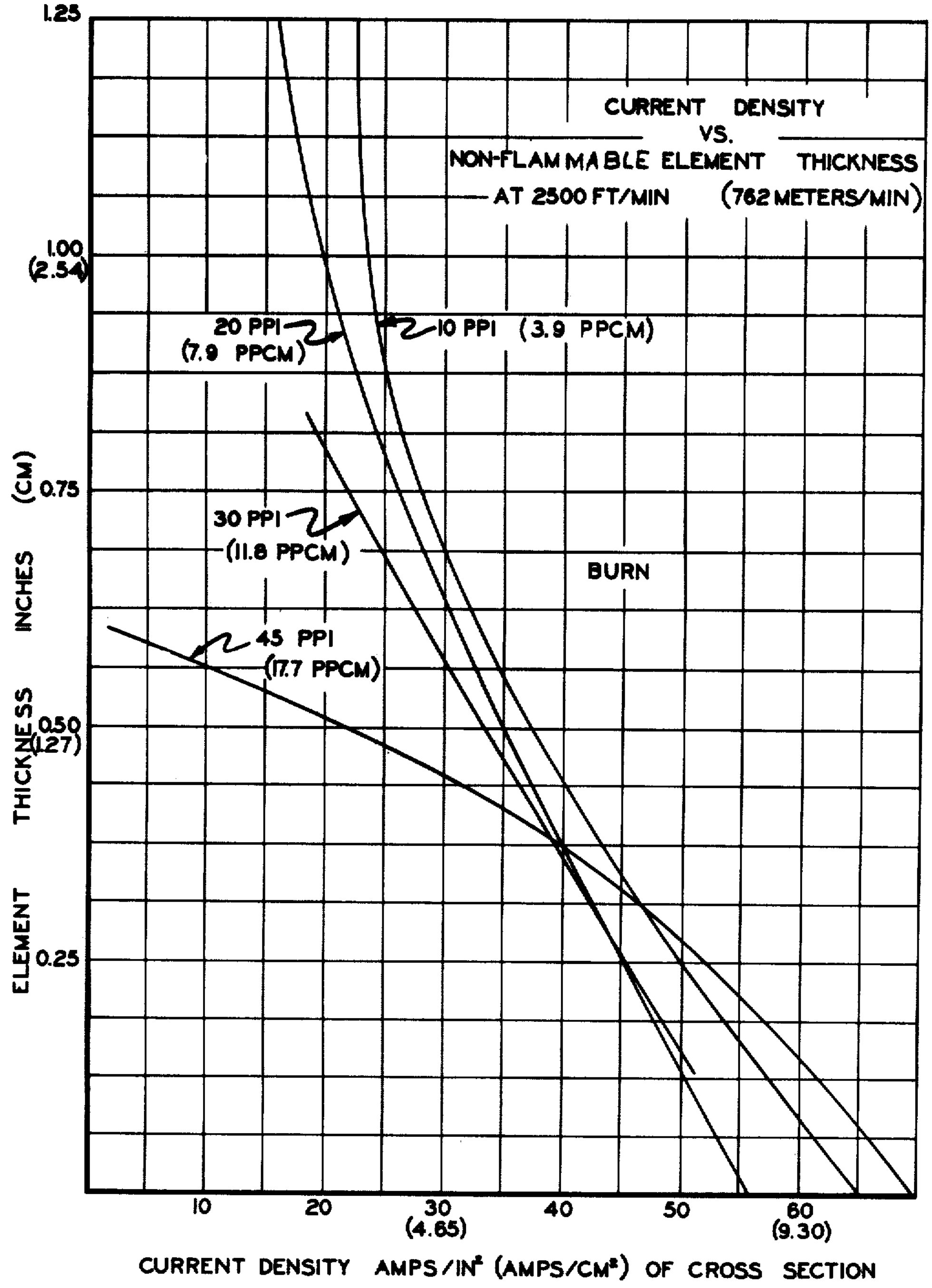
FIGS. 11 and 12 are graphs of data defining curves for vitreous carbon heat treated at 1000° C. (1832° F.) showing the element thickness of various porosities parallel to the air flow direction for electrical resistance elements with rectangular cross-sections at different current densities and at two selected constant upstream air flow velocities, where to the right of the curves there is combustion or burning of the porous vitreous carbon because the element is too thick and/or the pores are too small and/or the current density is too high.
Figure 12:
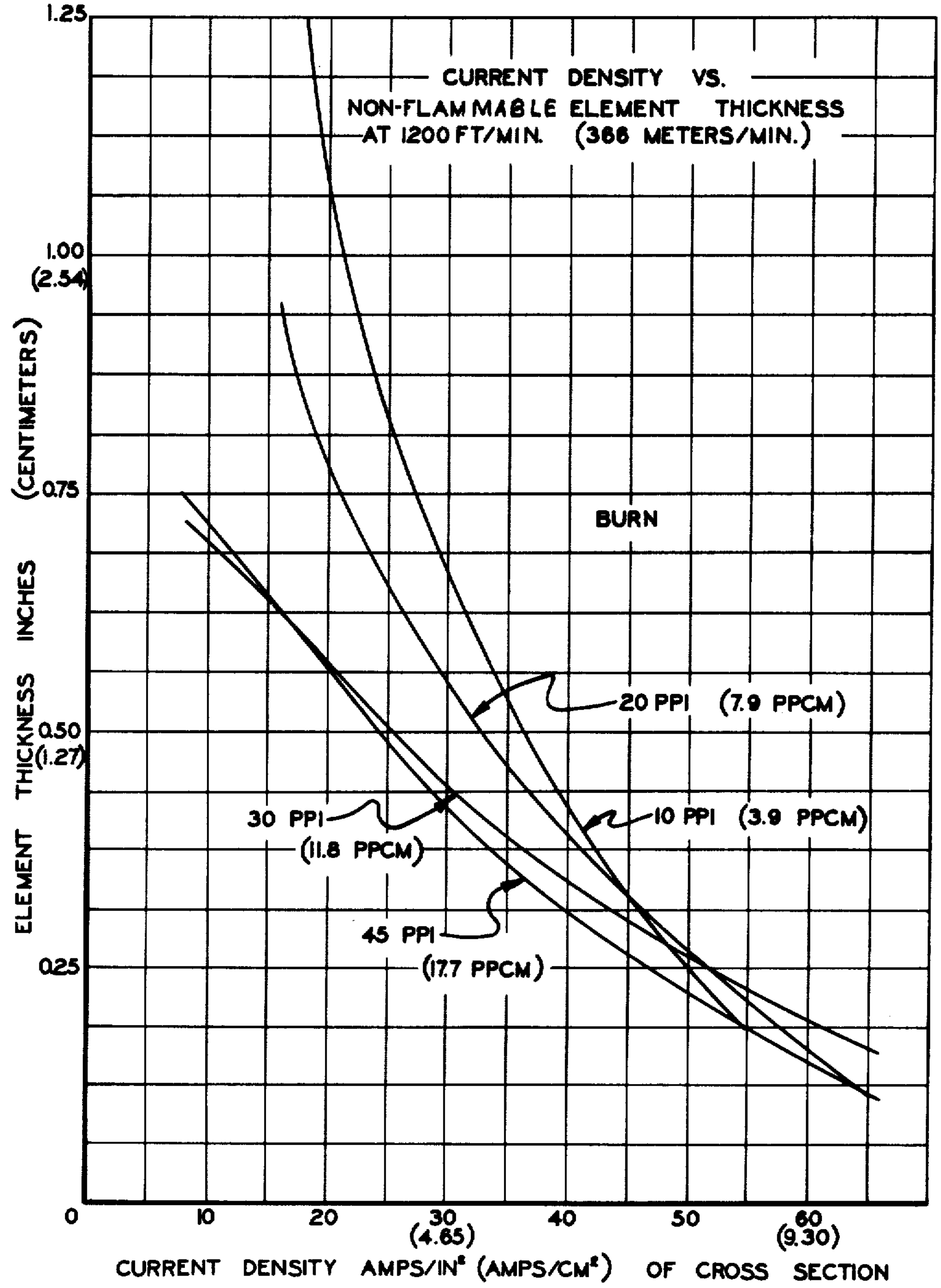
Figure 13:
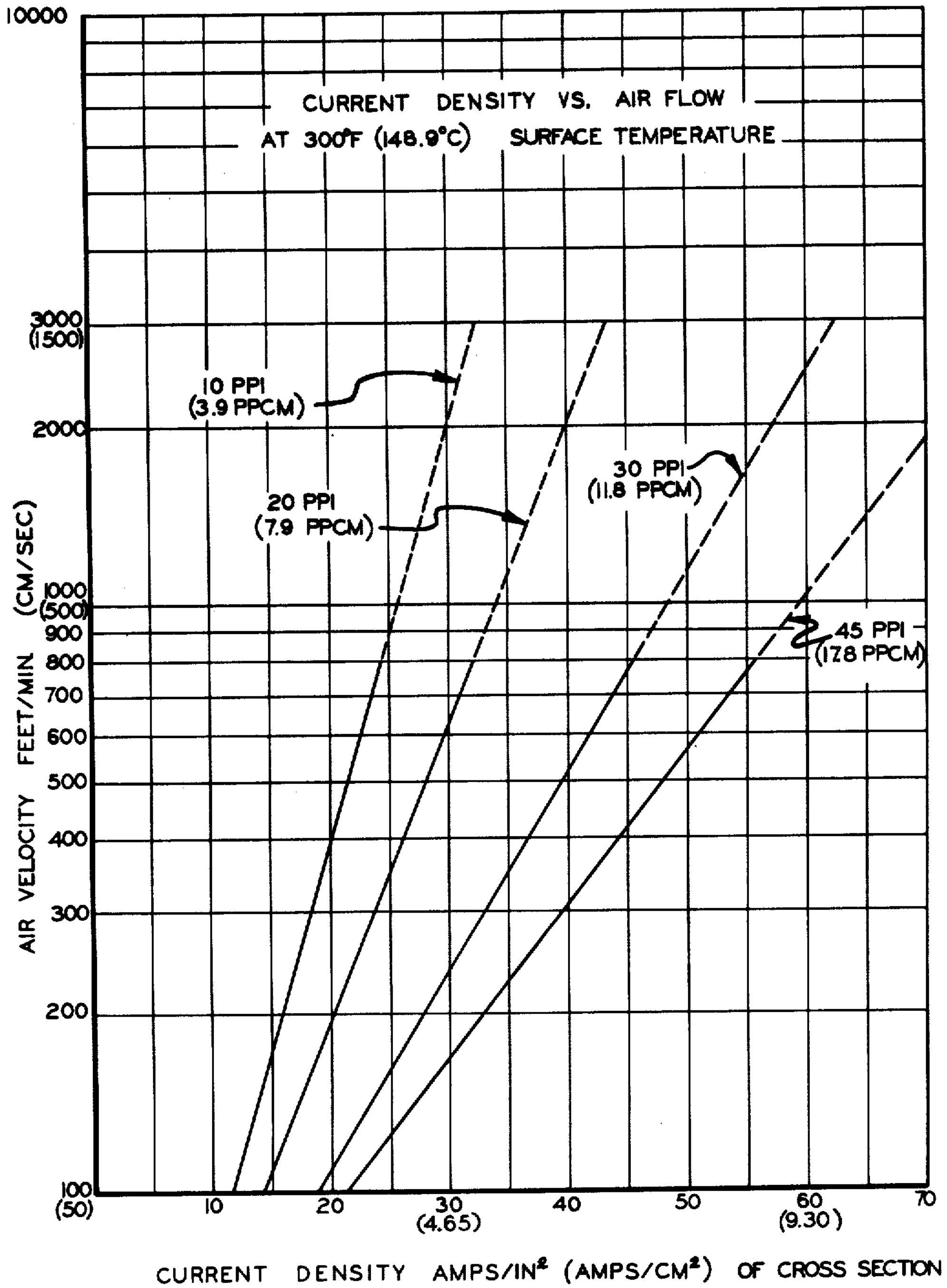
FIGS. 13 and 14 are graphs of data defining curves showing the air flows and current density necessary to achieve two selected operating temperatures for rectangular porous vitreous carbon resistance elements of about 0.64 cm (¼ inch) thickness which have been heat treated at 1000° C. (1832° F.).
Figure 14:
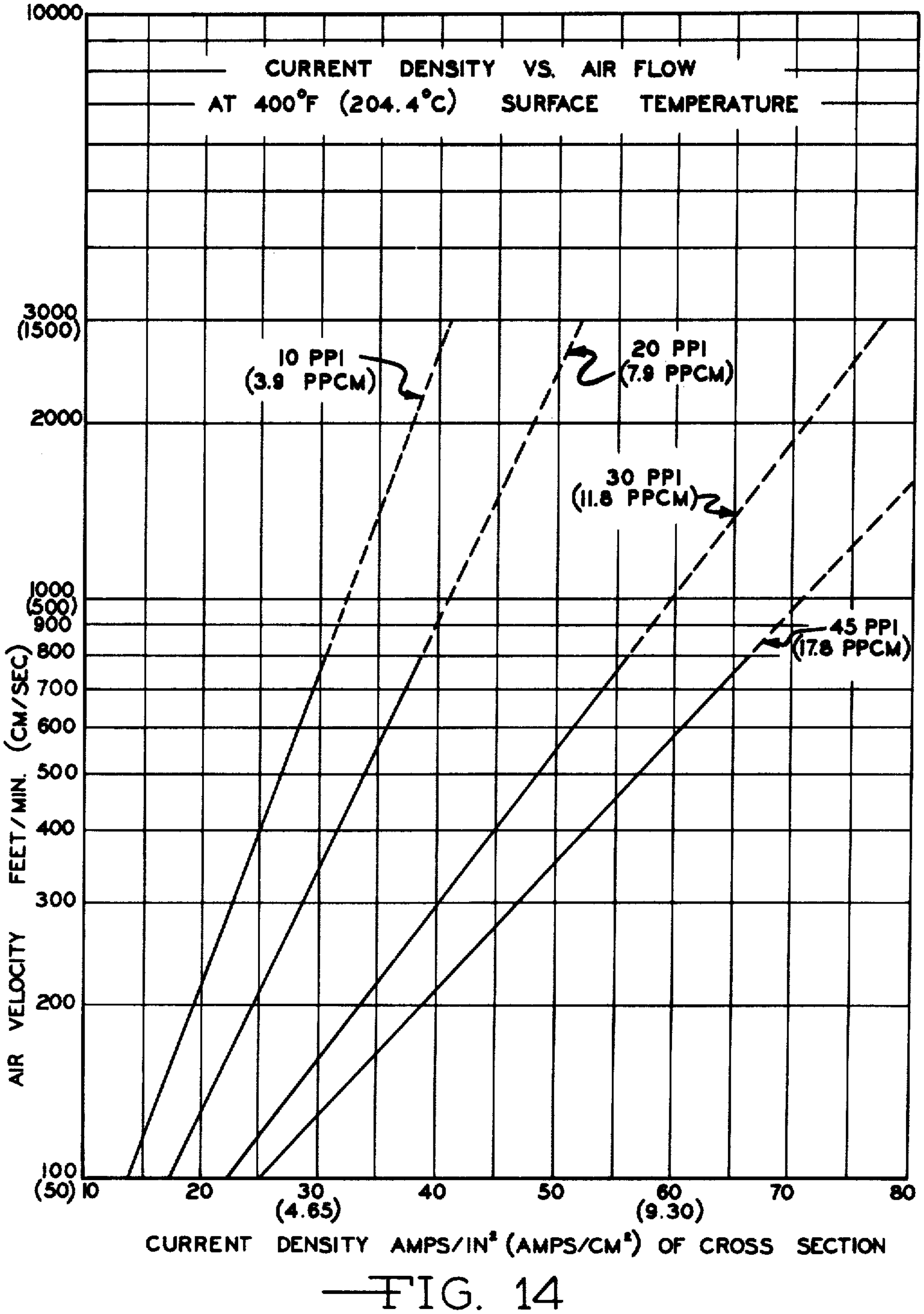

The graphs of FIGS. 11 and 12 summarize the data and show the thickness limits of various porosities of 1000° C. (1832° F.) heat treated porous vitreous carbon at two different constant and impinging air flow rates where the electrical resistance element can be used without burning. Those two charts were determined by heating the element resistively in still air and then applying an air stream at the indicated velocity to the heated body. The maximum thickness at which the element did not visibly ignite was considered to be the maximum useful thickness for that particular porosity and air flow which could be used. The thinner the element, the higher the temperature to which it could be heated before visible burning occurs. Although the carbon temperatures are not given per se in FIGS. 11 and 12, the current density is shown and that is proportional to the carbon temperature as shown in FIG. 10.

The graphs 13 and 14 show the air velocity vs. current density for two usual constant temperatures for appliances using the 1000° C. (1832° F.) heat treated porous vitreous carbon. In all instances, the surface temperatures were measured with a remote infra-red radiation sensing apparatus which measures the temperature of several strands in the body at a time, so the temperatures are averaged.

There is a practical limit in maximum cross-section dimension in the direction of air flow for forced air heater elements for any given porosity and air flow if severe oxidation and ultimate destruction of the carbon when used in air is to be avoided. In blower driven heaters, the chance that the blower air stream can be cut off by covering the air inlet or outlet (during which time the porous vitreous carbon body temperature will rise drastically and instantly in the still air) is so great that the element must be designed so that when air flow is resumed the body does not ignite. The porosity to thickness to air flow combination at a constant current density thus forms an unobvious limit to the practical use of porous vitreous carbon in forced air heating devices.

In both still air and forced air it is also necessary to keep the porous vitreous carbon body temperature below a level at which significant electrical resistance changes occur. Because heat transfer of the porous vitreous carbon is so effective and the response time extremely rapid, the heated outlet air temperature can be quite close to the body surface temperature, unlike metal wire resistance heating elements, and is less than 100° C. (212° F.) cooler at element temperatures up to 350° C. (662° F.) as measured in still air.

The features which make porous vitreous carbon bodies important electrical resistance elements are: (1) High surface area of the body for good heat transfer; (2) Excellent turbulence generation by the body for good heat transfer; (3) Sufficient specific resistivity to act as an electrical resistance heater; (4) Self-supporting and rigid characteristics at room and elevated temperatures in flowing fluid streams; (5) Design flexibility and ease of forming of the elements because of the rigid and self-supporting, porous three dimensional nature; (6) Essentially instant heating of the fluid flowing through the porous vitreous carbon body because of its surface area, turbulence generation characteristics and very low heat capacity. The "instant-on" factor is especially desirable for consumer heating appliances and also results in an "instant-off" characteristic; (7) Because of the great efficiency with which the body transfers heat to the fluid stream, the same fluid temperature can be achieved with porous vitreous carbon body temperatures which are well below the element temperatures required with nickel-chromium heaters. This is a safety factor; and it is very unexpected that an oxidizable material such as carbon can effectively be used as a resistance heating element in air without self-destructing by igniting. Significantly less energy is expended in some applications because of the more efficient heat transfer; (8) The elements have a very small thermal expansion; (9) Low cost as compared to other resistance heater elements; and (10) the negative temperature coefficient of resistance inherent to vitreous carbon.

It has also been found that the vitreous carbon body used in the apparatus of the present invention is highly absorptive of electromagnetic energy which can be used to rapidly heat a fluid stream flowing through the body. Thus solar heating or other forms of radiant or electromagnetic energy including radio frequency fields particularly microwaves, can be used. Also, energy radiated from a heated body can be used to heat the vitreous carbon. All of these variations will be obvious to those skilled in the art based upon the electrical resistance element description.

We claim:

1. A method for supplying heat to a fluid which comprises:
   (a) providing a body of rigid, interconnected, multidirectional and continuous strands of vitreous carbon forming a rigid, porous, three dimensional skeletal structure, said body being so structured that it can withstand sustained heating in air to about nominally 350° C. without cracking or significant electrical resistance change measured at room temperature; and
   (b) supplying electrical or electromagnetic energy to the body such that a fluid flowing in the body is heated by heat transfer.

2. The method of claim 1 wherein the fluid is air and the body is heated to about 125° C. or less in the presence of air which is forced through the body.

3. The method of claim 1 wherein the electromagnetic energy is solar or radiofrequency.

4. A method for supplying heat to a fluid which comprises:
   (a) providing a body of rigid, interconnected, multidirectional and continuous strands of vitreous carbon forming a rigid, porous, three dimensional skeletal structure, said body having been heat treated to at least about 1800° C. in a non-reactive atmosphere; and
   (b) supplying electrical or electromagnetic energy to the body such that a fluid flowing in the body is heated by heat transfer, wherein the body is at a temperature such that the body has an electrical resistance measured at room temperatures which remains substantially constant with time in the presence of the heated fluid.

5. An apparatus for supplying heat to a fluid stream which comprises:
   (a) a body of rigid, interconnected, multidirectional and continuous strands of vitreous carbon forming a rigid, porous, three dimensional skeletal structure, said body being so structured that it can withstand sustained heating in air to nominally about 350° C. without cracking or significant electrical resistance change measured at room temperature;
   (b) means for supplying electrical or electromagnetic energy to the body, such that the body is heated by the energy; and
   (c) means for supplying a fluid stream through the body such that the fluid stream is heated by heat transfer with the heated body.

6. An apparatus for supplying heat to a fluid stream which comprises:
   (a) a body of rigid, interconnected, multidirectional and continuous strands of vitreous carbon forming a rigid, porous, three dimensional skeletal structure, said body having been heat treated to at least about 1800° C. in a non-reactive atmosphere;

(b) means for supplying electrical or electromagnetic energy to the body, such that the body is heated by the energy; and (c) means for supplying a fluid stream through the body such that the fluid stream is heated by heat transfer with the heated body and such that the body has an electrical resistance measured at room temperature which remains substantially constant with time in the presence of the heated fluid stream.

7. The apparatus of claims 5 or 6 wherein the electromagnetic energy is solar or radiofrequency.

* * * * *